United States Patent
Chiu

(10) Patent No.: US 9,521,094 B2
(45) Date of Patent: Dec. 13, 2016

(54) NETWORK SWITCH FOR POWER SAVING

(71) Applicant: HON HAI PRECISION INDUSTRY CO., LTD., New Taipei (TW)

(72) Inventor: Chao-Ying Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 448 days.

(21) Appl. No.: 14/086,974

(22) Filed: Nov. 22, 2013

(65) Prior Publication Data

US 2014/0177642 A1 Jun. 26, 2014

(30) Foreign Application Priority Data

Dec. 20, 2012 (TW) .............................. 101148549 A

(51) Int. Cl.
*H04L 12/931* (2013.01)
*H04L 12/46* (2006.01)

(52) U.S. Cl.
CPC ......... *H04L 49/351* (2013.01); *H04L 12/4641* (2013.01)

(58) Field of Classification Search
CPC ........ H04L 49/00; H04L 12/00; H04L 49/351; H04L 12/4641
See application file for complete search history.

(56) References Cited

U.S. PATENT DOCUMENTS

| | | | | |
|---|---|---|---|---|
| 6,981,174 B1* | 12/2005 | Hanning | ............. | G06F 11/2007 714/4.11 |
| 2006/0002311 A1* | 1/2006 | Iwanaga | ............. | H04L 12/4675 370/254 |
| 2007/0121663 A1* | 5/2007 | Yousefi | .................... | H04L 12/12 370/446 |
| 2007/0268823 A1 | 11/2007 | Madison et al. | | |
| 2008/0080543 A1* | 4/2008 | Hickox | ............... | H04L 12/4625 370/419 |
| 2010/0054251 A1* | 3/2010 | Lee | ..................... | H04L 12/4641 370/392 |
| 2010/0274943 A1* | 10/2010 | Mahadevan | .......... | G06F 13/385 710/316 |
| 2012/0120958 A1* | 5/2012 | Mahadevan | ............ | H04L 12/12 370/392 |
| 2012/0170592 A1* | 7/2012 | Dudkowski | ............. | H04L 12/12 370/419 |

FOREIGN PATENT DOCUMENTS

| | | |
|---|---|---|
| CN | 101494602 A | 7/2009 |
| CN | 101854246 A | 10/2010 |
| CN | 102752157 A | 10/2012 |

* cited by examiner

*Primary Examiner* — Andrew Lai
*Assistant Examiner* — Sumitra Ganguly
(74) *Attorney, Agent, or Firm* — Zhigang Ma

(57) ABSTRACT

A network switch includes a plurality of physical layer (PHY) chips and a processor. Each of the PHY chips includes a plurality of network interfaces configured to connect to external network devices. The processor includes a port information (PI) table configured to record a working state of each PHY chip and to record used network interfaces of each PHY chip. When there are one or more PHY chips which network interfaces are all not used, the processor controls the one or more PHY chips to work in a sleep state.

12 Claims, 4 Drawing Sheets

111

| Chip ID | VLAN | Network Interface | Chip state |
|---|---|---|---|
| a | VLAN1 | 1,2,3,4 | Active |
| b | VLAN1 | 9,12 | Active |
| b | VLAN2 | Null | Active |
| c | VLAN2 | 19,20,21,22 | Active |

FIG. 3

NETWORK SWITCH FOR POWER SAVING

BACKGROUND

1. Technical Field

Embodiments of the present disclosure relate to a network switch.

2. Description of Related Art

Network switches (e.g., Ethernet switches) are widely used in various network environments. The network switches include a plurality of physical layer (PHY) chips. Each PHY chip includes a plurality of network interfaces for connecting external network devices (e.g., computers or servers). However, even if only few of the network interfaces are used, all of the PHY chips need to keep working, which wastes energy. Therefore, there is room for improvement in the art.

SUMMARY OF THE INVENTION

A network switch includes a plurality of physical layer (PHY) chips and a processor. Each of the PHY chips includes a plurality of network interfaces configured to connect to external network devices. The processor includes a port information (PI) table configured to record a working state of each PHY chip and to record used network interfaces of each PHY chip. When there are one or more PHY chips which network interfaces are all not used, the processor controls the one or more PHY chips to work in a sleep state.

Other advantages and novel features will become more apparent from the following detailed description when taken in conjunction with the accompanying drawings.

BRIEF DESCRIPTION OF THE DRAWINGS

FIG. 3 shows a schematic diagram of a port information (PI) table of FIG. 1.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one". The reference "a plurality of" means "at least two".

Figure 1:
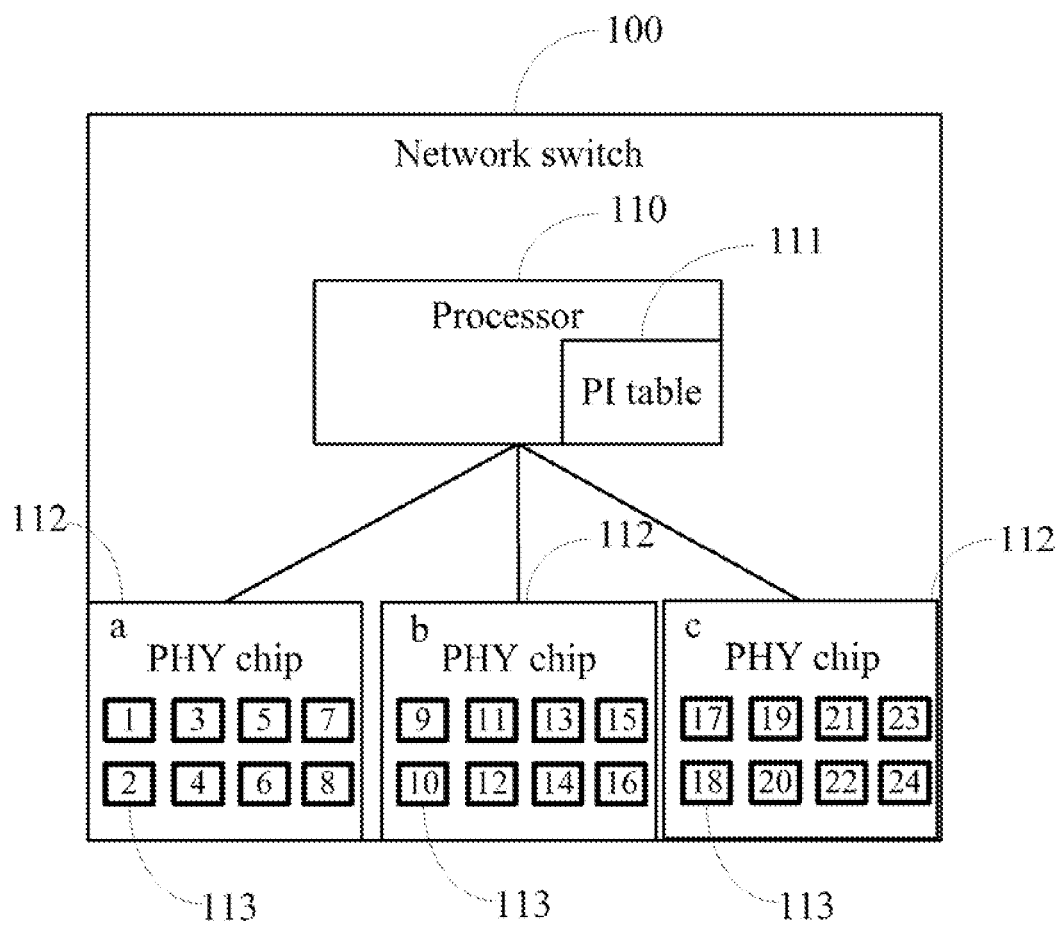
FIG. 1 is a schematic view of a network switch according to an exemplary embodiment.

FIG. 1 shows a schematic view of a network switch 100 according to an exemplary embodiment. The network switch 100 includes a processor 110 and a plurality of physical layer (PHY) chips 112. Each of the PHY chips 112 includes a plurality of network interfaces 113. Each network interface is configured to connect to an external network device (e.g., a computer or a server), to provide network services for the external network device. In addition, each PHY chip 112 has a chip identification (ID), and each network interface 113 has an interface ID. In FIG. 1, in one embodiment, the network switch 100 may include three PHY chips 112. Each PHY chip 112 includes eight network interfaces. The chip ID of each of the three PHY chips 112 respective are a, b, and c. The interface ID of each of the network interfaces of the three PHY chips 112 respective are 1, 2, 3 . . . 24.

Figure 2:
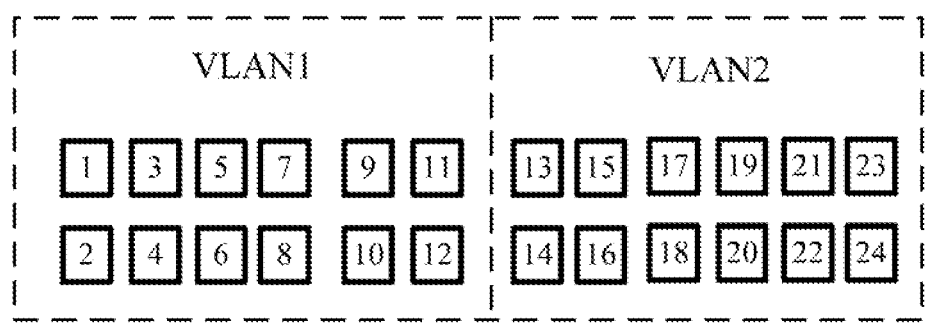
FIG. 2 illustrates a schematic diagram of network interfaces of the network switch which are located at different virtual local area networks (VLAN).

The network switch 100 includes one or more virtual local area network (VLAN). FIG. 2 shows that in one embodiment, the network switch 100 may include a first VLAN (VLAN 1) and a second VLAN (VLAN 2). A portion of the network interfaces 113 are distributed in the first VLAN, and the other network interfaces 113 are distributed in the second VLAN. For example, the network interfaces 1-12 are distributed in the first VLAN, and the network interfaces 13-24 are distributed in the second VLAN.

The processor 110 includes a port information (PI) table 11 configured to record a working state of each PHY chip 112 and to record the used network interfaces 113 of each PHY chip 112. In the embodiment, the working state of each PHY chip 112 may include an active state and a sleep state. When the PHY chip 112 is working in the activate state, all functions of the PHY chip 112 are enabled. When the PHY chip 112 is working in the sleep state, a portion of functions or all functions, such as a data sending/receiving function and a data coding/decoding function, of the PHY chip 112 are disabled, to decrease energy waste. That is, the PHY chip 112 is in a low power waste state when it is working in the sleep state.

The processor 110 detects if there is one or more PHY chip 112 having network interfaces 113 that are all not used according to the PI table 11. When one or more PHY chip 112 which network interfaces 113 that are all not used is detected, the processor 110 controls the one or more detected PHY chip 112 to work in the sleep state. When the one or more detected PHY chip 112 has been in the sleep state, the processor 110 further updates the working state of the one or more detected PHY chip 112 recorded in the PI table 111.

FIG. 3 shows a schematic diagram of the PI table 111. The PI table 111 includes a chip ID column that records the chip ID of each of the PHY chips 112, a VLAN column that records the one or more VLAN of the network switch 100, a network interface column that records the used network interfaces of each of the PHY chips 112, and a chip state column that records the working state of each of the PHY chips 112.

When a connection state of a network interface 113 of a corresponding PHY chip 112 is changed, for example when an external network device is connected to or disconnected from a network interface 113 of the corresponding PHY chip 112, the corresponding PHY chip 112 sends a notification message to the processor 110. The notification message includes the port ID of the network interface 113 which connection state has been changed and the chip ID of the corresponding PHY chip 112. The processor 110 updates the PI table 111 according to the notification message. For example, the processor 110 may update the network interface column of the PI table 111 according to the notification message.

In addition, if each of the PHY chips 112 has one or more network interfaces 113 used, the processor 110 detects whether an amount of all unused network interfaces 113 of the PHY chips 112 exceeds a predetermined value (e.g., 8). When the detected amount exceeds the predetermined value, the processor 110 notifies a user to switch the external network devices from at least one PHY chip 112 to the other PHY chips 112, to make all network interfaces 113 of the at least one PHY chip 112 to be unused, thereby controlling the at least one PHY chip 112 to work in the sleep state. In the embodiment, the predetermined value is equal to or greater than number of the network interfaces of each PHY chip 112.

In one embodiment, the processor 110 may send a text message to a control device connected to a predetermined network interface 113 (e.g., the network interface 113 which ID is "1"), and display the text message on a graphic user interface (GUI) of the control device to notify the user.

Figure 4:
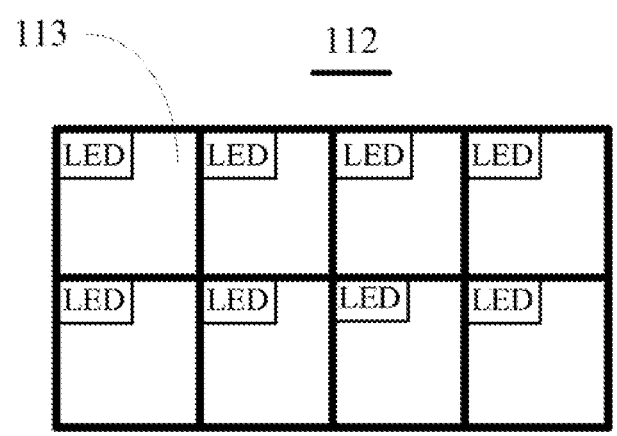
FIG. 4 shows a schematic diagram of a plurality light indicator of the network interfaces of FIG. 2.

FIG. 4 shows that in another illustrated embodiment, each of the network interfaces 113 includes a light indicator, such as a light emitting diode (LED). The processor 110 may control the light indicator of corresponding network interfaces 113 to emit predetermined color of light to notify the user to switch the external devices from the corresponding network interfaces 113 to other network interfaces 113. For example, when the light indicator of a first network interface 113 emits a first color light (e.g., green), it indicates that an external network device connected to the corresponding network interface 113 needs to be switched to other network interfaces 113. When the light indicator of a second network interface 113 emits a second color light (e.g., red), it indicates that the external network device connected to the first network interface 113 can be switched to the second network interface 113.

When an external network device is connected to a network interface of a PHY chip 113 which is in the sleep state, the processor 110 activates the PHY chip 112 from the sleep state, to control the PHY chip 112 to work in the active state. Then, the processor 110 updates the information of the PI table 111 when the PHY chip 112 is activated from the sleep state.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A network switch, comprising:
a plurality of physical layer (PHY) chips, each of the plurality of PHY chips comprising a plurality of network interfaces configured to connect to external network devices; and
a processor comprising a port information (PI) table configured to record a working state of the each of the plurality of the PHY chips and to record used network interfaces of the each of the plurality of the PHY chips, the processor detecting if there is one or more PHY chip having network interfaces that are all not used according to the PI table, and controlling the detected one or more PHY chip with network interfaces that are all not used to work in a sleep state;
wherein when the each of the plurality of the PHY chips which have one or more network interface is used, the processor detects whether a number of the all not used network interfaces of the plurality of the PHY chips exceeds a predetermined value, and outputs a corresponding notification, when it is detected that the number of the all not used network interfaces of the plurality of the PHY chips exceeds a predetermined value.

2. The network switch according to claim 1, wherein the each of the plurality of the PHY chips has a chip identification (ID) and each of the plurality of network interfaces has an interface ID.

3. The network switch according to claim 2, wherein when an external network device is connected to or disconnected from a network interface of a corresponding PHY chip, the corresponding PHY chip sends a notification message to the processor, and the processor updates the PI table according to the notification message.

4. The network switch according to claim 3, wherein the notification message comprises the a port ID of the network interface of the corresponding PHY chip and the chip ID of the corresponding PHY chip.

5. The network switch according to claim 1, wherein the notification is a text message sent to a control device connected to a predetermined network interface of the plurality of the PHY chips, and the text message is displayed on a graphic user interface (GUI) of the control device.

6. The network switch according to claim 2, wherein the PI table comprises a chip ID column that records the chip ID of the each of the plurality of the PHY chips, a network interface column that records the used network interfaces of the each of the plurality of the PHY chips, and a chip state column that records the working state of each of the PHY chips.

7. The network switch according to claim 6, wherein the working state of the each of the plurality of the PHY chips comprises an active state and the sleep state; when the PHY chip is working in the active state, all functions of the PHY chip are enabled; when the PHY chip is working in the sleep state, a portion of functions or all of functions of the PHY chip are disabled to decrease energy waste.

8. The network switch according to claim 1, wherein each of the plurality of network interfaces comprises a light indicator, the processor controls the light indicators of corresponding network interfaces to emit predetermined color of light which is an indication of switching the external network devices from the corresponding network interfaces to other network interfaces.

9. The network switch according to claim 8, wherein the light indicator is a light emitting diode (LED).

10. The network switch according to claim 1, wherein the predetermined value is equal to or greater than a number of the network interfaces of the each of the plurality of the PHY chips.

11. The network switch according to claim 1, wherein when an external network device is connected to a network interface of a PHY chip which is in the sleep state, the processor activates the PHY chip from the sleep state.

12. The network switch according to claim 11, wherein the processor further updates information of the PI table when the PHY chip is activated from the sleep state.

* * * * *